United States Patent
Kang et al.

(10) Patent No.: US 9,856,156 B2
(45) Date of Patent: Jan. 2, 2018

(54) APPARATUS FOR PREPARING ELECTROLYZED STERILIZING WATER, AND SYSTEM AND METHOD FOR PREPARING ELECTROLYZED STERILIZING WATER, CONTAINING SAME

(75) Inventors: Kyung Seok Kang, Daejeon (KR); Ho Il Lee, Daejeon (KR); Hyun Jong Park, Seoul (KR)

(73) Assignee: SION TECH CO., LTD., Daejeon (KR)

( * ) Notice: Subject to any disclaimer, the term of this patent is extended or adjusted under 35 U.S.C. 154(b) by 411 days.

(21) Appl. No.: 13/876,663

(22) PCT Filed: May 16, 2011

(86) PCT No.: PCT/KR2011/003579
§ 371 (c)(1),
(2), (4) Date: May 28, 2013

(87) PCT Pub. No.: WO2012/043956
PCT Pub. Date: Apr. 5, 2012

(65) Prior Publication Data
US 2013/0248377 A1 Sep. 26, 2013

(30) Foreign Application Priority Data
Sep. 28, 2010 (KR) .......... 10-2010-0093613

(51) Int. Cl.
*C02F 1/467* (2006.01)
*C02F 1/461* (2006.01)
*E03B 7/07* (2006.01)

(52) U.S. Cl.
CPC ............ *C02F 1/467* (2013.01); *C02F 1/4674* (2013.01); *E03B 7/074* (2013.01); *C02F 1/4618* (2013.01);
(Continued)

(58) Field of Classification Search
CPC ...... C02F 1/467; C02F 1/4674; C02F 1/4618; C02F 2201/46145; C02F 2209/40; E03B 7/074; E03C 1/046
See application file for complete search history.

(56) References Cited

U.S. PATENT DOCUMENTS

| 4,049,512 A | 9/1977 | Tolle, Jr. |
| 5,234,563 A * | 8/1993 | Arai ............... C02F 1/4618 204/228.3 |

(Continued)

FOREIGN PATENT DOCUMENTS

| EP | 1426336 | 6/2004 |
| JP | 08323307 | 12/1996 |

(Continued)

OTHER PUBLICATIONS

Walas, Stanley M. Chemical Process Equipment. 1990 (no month). Butterworth-Heinemann. pp. xi and 287-304.*

(Continued)

*Primary Examiner* — Steven A. Friday
(74) *Attorney, Agent, or Firm* — STIP Law Group, LLC (57) ABSTRACT

The present invention relates to an apparatus for preparing electrolyzed sterilizing water. More specifically, the present invention relates to an apparatus for preparing electrolyzed sterilizing water, wherein a rotator is provided inside a mixing portion, thereby uniformly mixing and dispersing an electrolysis product and feed water.

10 Claims, 9 Drawing Sheets

(52) U.S. Cl.
CPC   *C02F 2201/46145* (2013.01); *C02F 2209/40* (2013.01)

(56) References Cited

U.S. PATENT DOCUMENTS

| | | | |
|---|---|---|---|
| 6,200,434 B1* | 3/2001 | Shinjo et al. | 204/230.2 |
| 2001/0004962 A1* | 6/2001 | Hirota et al. | 204/228.1 |
| 2004/0073524 A1* | 4/2004 | Smith et al. | 705/412 |
| 2006/0070936 A1* | 4/2006 | Kato et al. | 210/192 |
| 2009/0148341 A1 | 6/2009 | Kanno et al. | |

FOREIGN PATENT DOCUMENTS

| | | |
|---|---|---|
| JP | 10298791 | 11/1998 |
| JP | 2000024670 | 1/2000 |
| JP | 2001104956 | 4/2001 |
| JP | 2005224691 | 8/2005 |
| JP | 2005246279 | 9/2005 |
| KR | 100634889 | 10/2006 |
| KR | 1020090052892 | 5/2009 |
| WO | 2007103234 | 9/2007 |

OTHER PUBLICATIONS

International Search Report—PCT/KR2011/003579 dated Feb. 6, 2012.
European Search Report—European Application No. 11829462.8 dated Sep. 19, 2014.

\* cited by examiner

APPARATUS FOR PREPARING ELECTROLYZED STERILIZING WATER, AND SYSTEM AND METHOD FOR PREPARING ELECTROLYZED STERILIZING WATER, CONTAINING SAME

TECHNICAL FIELD

The present invention relates to an apparatus for preparing electrolyzed sterilizing water, and a system and a method for preparing electrolyzed sterilizing water, including the same, and more particularly, to an apparatus for preparing electrolyzed sterilizing water, where a rotator is provided inside a mixing part to thereby uniformly mix and disperse an electrolysis product and raw water, and a system and a method for preparing electrolyzed sterilizing water, including the same.

BACKGROUND ART

Electrolyzed sterilizing water has sterilizing power and disinfecting power against various kinds of bacteria, fungi, viruses, and the like, and examples thereof may be hypochlorous acid or sodium hypochlorite.

Hypochlorous acid is a chlorine-based disinfectant, and a strong oxidant.

The sterilizing power and disinfecting power of the chlorine-based disinfectant are determined by free residual chlorine. The free residual chlorine is present as $Cl_2(aq)$, hypochlorous acid (HOCl), and a chlorite ion ($OCl^-$), and is present in a different existence form depending on pH.

The free residual chlorine is present in a form of chlorine gas ($Cl_2$) in pH 4 or lower, in a form of hypochlorous acid (HOCl) in weak acid and neutral zones, and in a form of chlorite ion ($OCl^-$) for an alkaline zone. The sterilizing power of the hypochlorous acid (HOCl) is known to be stronger than that of the chlorite ion ($OCl^-$).

The hypochlorous acid water is classified into strong acid type hypochlorous acid water (pH 2.7 or lower, concentration of available chlorine: 20~60 ppm) and weak acid type hypochlorous acid (pH 5.0~6.5, concentration of available chlorine: 10~30 ppm). In view of stability of the available chlorine, the weak acid type hypochlorous acid water is excellent.

In the related art, Korean Patent Registration No. 10-0634889 of the present applicant discloses a method for preparing sodium hypochlorite water.

According to the method, raw water containing a predetermined concentration of salt water is fed into a diaphragm electrolytic bath having a diaphragm disposed between a positive electrode and a negative electrode, and a direct current is applied to the positive electrode and the negative electrode, to thereby conduct electrolysis. Then, at the positive electrode, chlorine ions ($Cl^-$) dissociated from the raw water are oxidized to generate chlorine ($Cl_2(aq)$), which then reacts with the raw water to thereby generate a high concentration of hypochlorous acid water (NaOCl). At the negative electrode, sodium ions ($Na^+$) are reduced to react with the raw water, to thereby generate strong alkaline water (This constitution has been made by the inventors of the present application).

As another related art, there is a method for preparing weak acid type hypochlorous acid water by electrolyzing raw water added with 2~6% hydrochloric acid in a non-diaphragm electrolytic bath.

According to the method, chlorine ions ($Cl^-$) are oxidized to generate chlorine ($Cl_2(g)$), and the chlorine ($Cl_2(g)$) reacts with raw water ($H_2O$) to generate hypochlorous acid (HOCl), which is then mixed and diluted with a large amount of raw water to prepare weak acid type hypochlorous acid water of pH 5.0~6.5.

However, the apparatus for preparing hypochlorous acid water or sodium hypochlorite of the related art has a problem in that a low mixing degree of an electrolysis product, such as a high concentration of hypochlorous acid or sodium hypochlorite, and raw water results in insoluble chlorine ($Cl_2(g)$), which causes the deterioration in efficiency of preparing electrolyzed water.

Moreover, when the insoluble chlorine is used as electrolyzed sterilizing water, it remains on an object to be disinfected and thus causes deformation or spots on the object to be disinfected.

Moreover, the apparatus for preparing hypochlorous acid water or sodium hypochlorite of the related art requires a separate mixing and diluting bath for mixing the electrolysis product generated in the electrolytic bath with raw water therein, a valve for controlling the inflow of the raw water fed into the mixing and diluting bath, a separate water conduit for discharging the electrolyzed sterilizing water generated from the mixing and diluting bath, and the like, and thus the apparatus inevitably becomes more complicated and bigger.

DISCLOSURE

Technical Problem

An object of the present invention is to provide an apparatus for preparing electrolyzed sterilizing water capable of maximizing electrolysis efficiency of hypochlorous acid water or sodium hypochlorite water to improve productivity, and a system and a method for preparing electrolyzed sterilizing water, including the same.

Another object of the present invention is to provide an apparatus for preparing electrolyzed sterilizing water capable of preventing the waste of an electrolysis product by forming a rotator inside a mixing part to increase the dispersion degree of the electrolysis product and increase the mixing degree of raw water, and thus capable of improving production efficiency of the electrolyzed sterilizing water, and a system and a method for preparing electrolyzed sterilizing water, including the same.

Still another object of the present invention is to provide an apparatus for preparing electrolyzed sterilizing water capable of not needing separate power for rotating the rotator and having a small size through simple configuration, and a system and a method for preparing electrolyzed sterilizing water, including the same.

Technical Solution

In one general aspect, there is provided an apparatus for preparing electrolyzed sterilizing water, the apparatus including: a body 100; a reacting part 110 containing a positive electrode 111 and a negative electrode 112 therein thus allowing an electrolysis product to be generated by an electrolysis reaction inside the body 100; a mixing part 130 communicating with the reacting part 110 and thus allowing the electrolysis product generated in the reacting part 110 to move thereto, the mixing part 130 having a raw water inlet 131 through which raw water flows into and an outlet 132 through which electrolyzed sterilizing water in which the raw water and the electrolysis product are mixed flows out; and a rotating parts 200 rotating inside the mixing part 130.

The electrolysis product may contain hypochlorous acid water (HOCl) or sodium hypochlorite water (NaOCl).

The apparatus may further include a distributing plate 300 provided between the reacting part 110 and the mixing part 130 and having a plurality of micropores 301 formed therein.

The rotating part 200 may be provided in plural numbers inside the reacting part 110.

The rotating part 200 may include a central shaft 201 and a plurality of wings 202 formed at the circumference of the central shaft 201.

The rotating part 200 may be rotated by the raw water flowing into through the raw water inlet 131.

The mixing part 130 may be formed above the reacting part 110.

The positive electrode 111 and the negative electrode 112 may be provided in a height direction inside the reacting part 110 of the body 100.

In another general aspect, there is provided a system for preparing electrolyzed sterilizing water, the system including: the above-described apparatus for preparing electrolyzed sterilizing water 1000; a water conduit 2000 connected with the outlet 132; an electrolyte feeding unit 3000 including an electrolyte storage 3100, a first pipe 3200 connecting the electrolyte storage 3100 and the body 100, and a pump 3300 provided at the first pipe 3200, the electrolyte feeding unit 3000 feeding an electrolyte into the reacting part 110 of the body 100; a raw water feeding unit 4000 including a second pipe 4100 connected with the raw water inlet 131 of the mixing part 130 and a flux sensor 4200 provided at the second pipe 4100, the raw water feeding unit 4000 feeding the raw water into the mixing part 130 of the body 100; a power supply unit 5000 electrically conducted with the positive electrode 111 and the negative electrode 112 inside the body 100 to supply power; and a control unit 6000 connected with the flux sensor 4200, the pump 3300, and the power supply unit 5000 to control operations thereof.

In still another general aspect, there is provided a method for preparing electrolyzed sterilizing water using the system for preparing electrolyzed sterilizing water 1, the method including: a raw water feeding stage (S10) of feeding raw water into the mixing part 130 from the raw water feeding unit 4000 by an operation of the water conduit 2000; a raw water feed amount sensing stage (S11) of sensing a feed amount of raw water by using the flux sensor 4200 in the raw water feeding stage (S10); an electrolyte feeding stage (S20) of feeding an electrolyte through the first pump 3300 of the electrolyte feeding unit 3000 depending on the feed amount of raw water sensed in the raw water feed amount sensing stage (S11); and an electrolyzed sterilizing water generating stage (S30) of generating electrolyzed sterilizing water by including an electrolyzing stage (S31) of applying power to the electrodes 111 and 112 inside the reacting part 110 from the power supply unit 5000 to electrolyze the electrolyte and a mixing stage (S32) of mixing an electrolysis product and the fed raw water inside the mixing part 130.

Advantageous Effects

As set forth above, according to the apparatus for preparing electrolyzed sterilizing water, and the system and the method for preparing electrolyzed sterilizing water including the same, of the present invention, electrolysis efficiency of hypochlorous acid water and sodium hypochlorite water can be maximized, thereby improving productivity.

Further, according to the apparatus for preparing electrolyzed sterilizing water, and the system and the method for preparing electrolyzed sterilizing water including the same, of the present invention, the rotator is provided inside the mixing part, thereby increasing the dispersion degree of electrolysis product and increasing the mixing degree of raw water, and thus preventing the waste of the electrolysis product and improving production efficiency of the electrolyzed sterilizing water.

Further, according to the apparatus for preparing electrolyzed sterilizing water, and the system and the method for preparing electrolyzed sterilizing water including the same, of the present invention, a separate power for rotating the rotator is not needed and the miniaturization thereof can be achieved through a simple constitution.

Further, according to the apparatus for preparing electrolyzed sterilizing water, and the system and the method for preparing electrolyzed sterilizing water including the same, of the present invention, the distributing plate is formed between the reacting part and the mixing part to micronize the electrolysis product, thereby further increasing the mixing degree with the raw water.

Further, according to the apparatus for preparing electrolyzed sterilizing water, and the system and the method for preparing electrolyzed sterilizing water including the same, of the present invention, the raw water is fed by an operation of the water conduit, and thus a separate valve for controlling the inflow of raw water is not needed and the existing water conduit is used, thereby simplifying the constitution of the apparatus and thus achieving miniaturization.

\* Detailed Description of Main Elements \*

| | |
|---|---|
| 1: system for preparing electrolyzed sterilizing water | |
| 1000: apparatus for preparing electrolyzed sterilizing water | |
| 100: body | 110: reacting part |
| 111: positive electrode | 112: negative electrode |
| 113: feeding portion | |
| 130: mixing part | 131: raw water inlet |
| 132: outlet | |
| 200: rotating part | 201: central shaft |
| 202: wing | |

-continued

* Detailed Description of Main Elements *

2000: water conduit
3000: electrolyte feeding unit       3100: electrolyte storage
3200: first pipe                     3300: pump
4000: raw water feeding unit         4100: second pipe
4200: flux sensor
5000: power supply unit
6000: control unit
S10~S30: respective stages in the method for preparing
electrolyzed sterilizing water of the present invention

BEST MODE

Hereinafter, the apparatus 1000 may include a body 100 having a reacting part 110 and a mixing part 130, and a rotating part 200.

The body 100 has a space where the reacting part 110 and the mixing part 130 are formed, and here, they may be formed as one body, or may be formed by coupling two or more components.

The reacting part 110 has a predetermined space inside the body 100. A high concentration of electrolysis product is generated in the reacting part 110. A positive electrode 111 and a negative electrode 112 are provided inside the reacting part 110, to generate the electrolysis product by an electrolysis reaction.

A feeding portion 113 is formed at one side of the reacting part 110 to feed an electrolyte. The electrolyte may be a diluted hydrochloric acid solution or sodium chloride solution.

Here, in the reacting part 110, current is applied to the positive electrode 111 and a negative electrode 112 to induce an electrolysis reaction.

A pipe through which an object to be electrolyzed (hydrochloric acid solution or sodium chloride solution) is fed is connected to the feeding portion 113. An object to be electrolyzed-storing portion storing the object to be electrolyzed, a controlling portion controlling the feed amount of the object to be electrolyzed, a pump for feeding the object to be electrolyzed therethrough, and the like may be provide at the pipe.

Here, in the case where the solution fed through the feeding portion 113 is a hydrochloric acid solution, the following reaction is induced inside the reacting part 110.

Positive Electrode:

$$2Cl^- - 2e \rightarrow Cl_2$$

$$2H_2O - 4e \rightarrow 4H^+ + O_2$$

Negative Electrode:

$$2H^+ \rightarrow H_2$$

Mixing Reaction:

$$Cl_2 + H_2O \rightarrow HOCl + HCl$$

Total Reaction:

$$HCl + H_2O \rightarrow HOCl + H_2(gas)$$

In other words, at the time of electrolyzing the hydrochloric acid solution, hypochlorous acid water (HOCl), hydrogen gas, and chlorine gas are generated.

In addition, in the case where the solution fed through the feeding portion 113 is a sodium chloride solution, the following reaction is induced inside the reacting part 110.

Positive Electrode:

$$2Cl^- - 2e \rightarrow Cl_2$$

$$2H_2O - 4e \rightarrow 4H^+ + O_2$$

Negative Electrode:

$$Na + 2e \rightarrow 2Na$$

$$2Na + 2H_2O \rightarrow NaOH + H_2$$

Mixing Reaction:

$$NaOH + Cl_2 \rightarrow NaOCl + HCl$$

Total Reaction:

$$NaCl + H_2O \rightarrow NaOCl + H_2(gas)$$

The feeding portion 113 is positioned at a lower portion of one side surface on the drawings, but the apparatus for preparing electrolyzed sterilizing water 1000 of the present invention is not limited thereto.

Meanwhile, the positive electrode 111 and the negative electrode 112 are provided in a height direction inside the reacting part 110, to thereby increase the contact time with the object to be electrolyzed (hydrochloric acid solution or sodium chloride solution) and thus further increase efficiency of the electrolysis reaction.

The mixing part 130 is a space where the raw water is fed through a raw water inlet 131 formed at one side thereof and the electrolysis product is fed through the reacting part 110 and thus the raw water and the electrolysis product are mixed with each other.

A pipe for feeding the raw water therethrough is connected to the raw water inlet 131. A raw water-storing portion storing the raw water, a controlling portion controlling the feed amount of the raw water, a pump for feeding the raw water therethrough, and the like may be provide at the pipe.

The apparatus for preparing electrolyzed sterilizing water 1000 of the present invention can have a smaller size and a simpler constitution by including the reacting part 110 and the mixing part 130 adjacent to each other.

In addition, the rotating part 200 is further provided in the mixing part 130 to improve the mixing degree of the raw water and the electrolysis product.

The rotating part 200 is capable of rotating inside the mixing part 130 to form a vortex and the raw water and the electrolysis product form turbulence, so that the electrolysis product is uniformly dispersed throughout the entire raw water to increase the contact time with the raw water, and thus the mixing degree of the raw water and the electrolysis product can be remarkably increased.

The apparatus for preparing electrolyzed sterilizing water 1000 of the present invention does not require a separate space for mixing the raw water or the electrolysis product therein and does not need components, such as an injector for injecting the raw water or the electrolysis product, a sparger for increasing the mixing degree, and the like, and thus can simplify the constitution, and further can remarkably increase the mixing degree of the raw water and the electrolysis product.

The rotating part 200 may include a central shaft 201 and a plurality of wings 202 formed at the circumference of the central shaft 201. In addition to this, the rotating part 200 may be variously formed so long as it has any constitution that can increase the mixing degree of the raw water and the electrolysis product by rotation.

The rotation power of the rotating part 200 may be separately supplied through an external connection. Alternatively, the rotating part 200 may be formed adjacently to the raw water inlet 131 through which the raw water flows into, to thereby be rotatable by kinetic energy of the raw water.

In addition, the outlet 132 through which the electrolyzed sterilizing water where the raw water and the electrolysis product are mixed flows out may be formed at the mixing part 130.

That is, the raw water flows into the mixing part 130 through the raw water inlet 131 and the electrolysis product flows into the mixing part 130 from the reacting part 110, and the raw water and the electrolysis product are uniformly mixed by the rotating part 200 and then flow out through the outlet 132.

In addition, the reacting part 110 and the mixing part 130 are demarcated by a distributing plate 300. The distributing plate 300 has a plurality of micropores 301 through which the electrolysis product moves.

Figure 1:
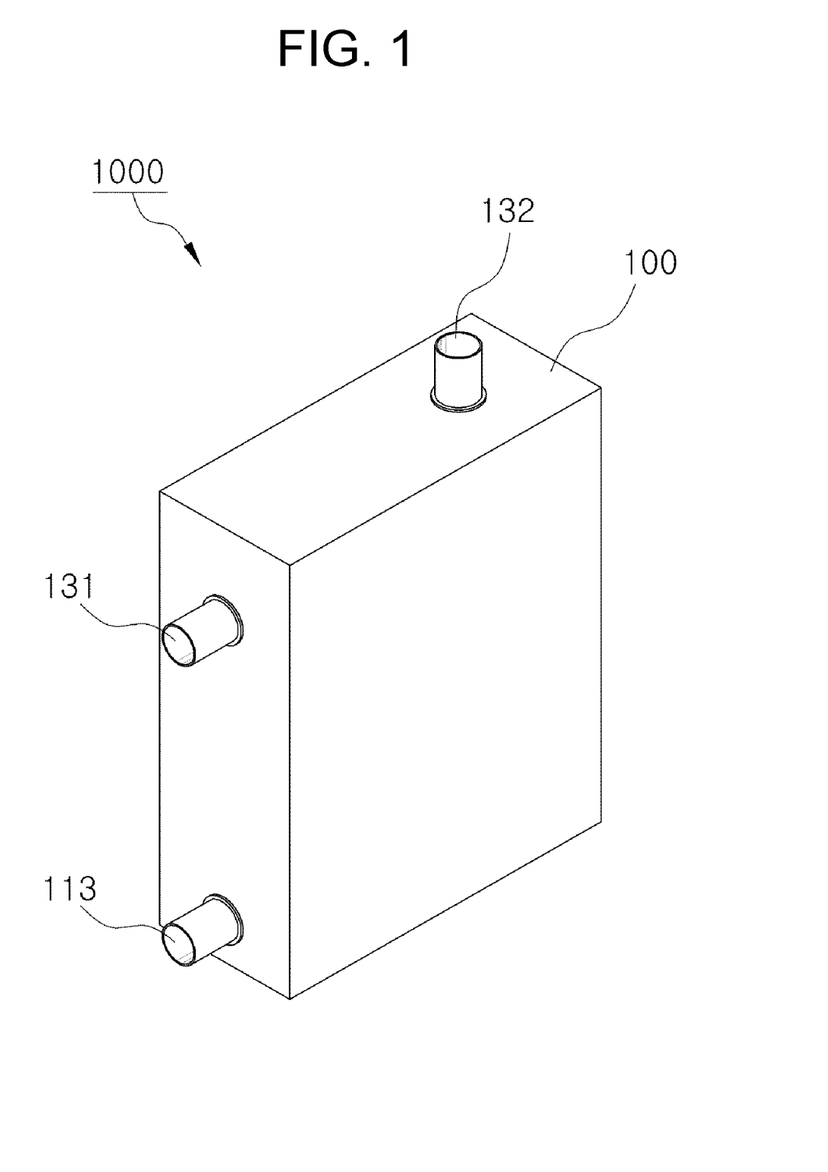
FIG. 1 is a perspective view of an apparatus for preparing electrolyzed sterilizing water according to the present invention.
Figure 2:
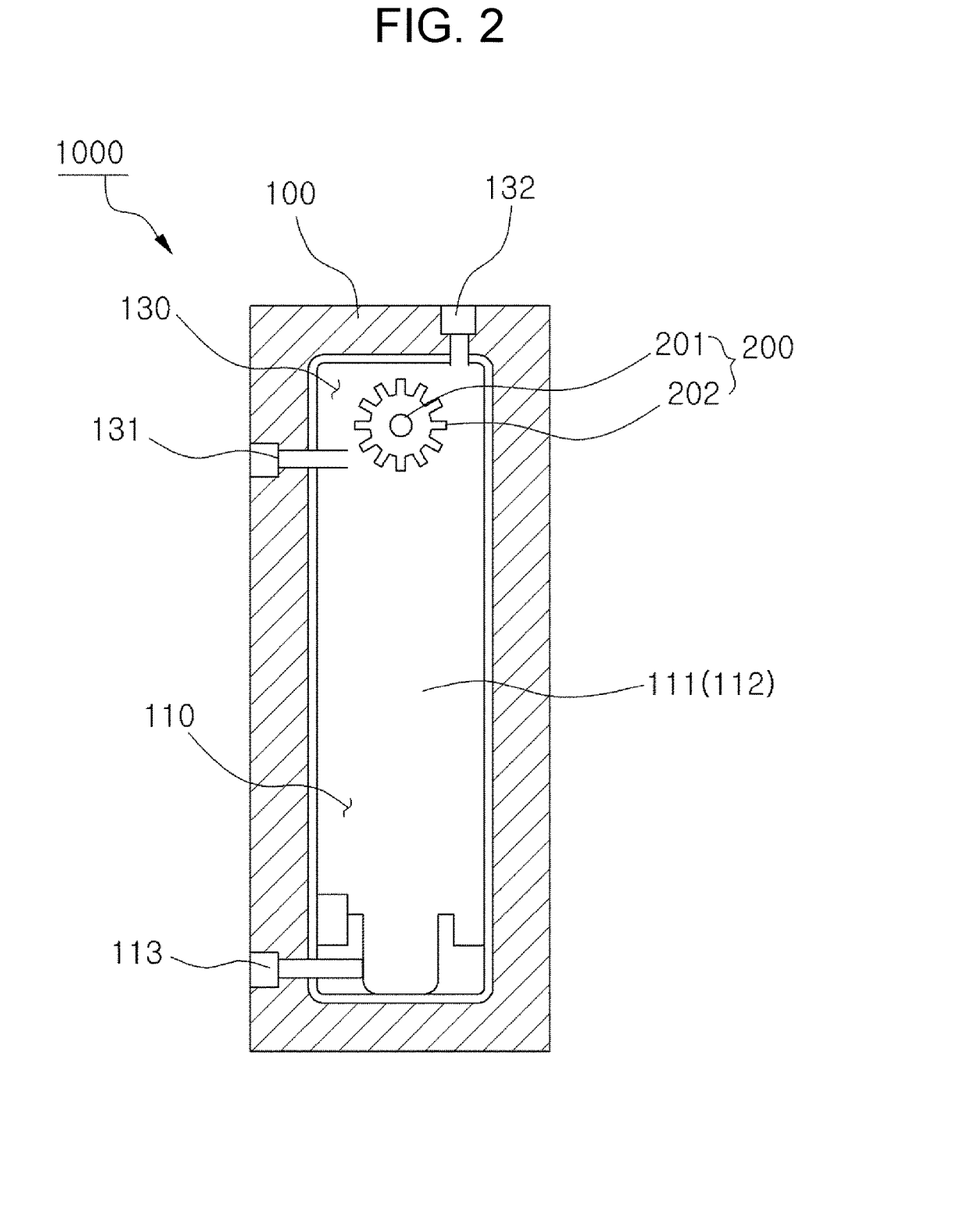
FIG. 2 is a cross-sectional view of the apparatus for preparing electrolyzed sterilizing water according to the present invention.
Figure 3:
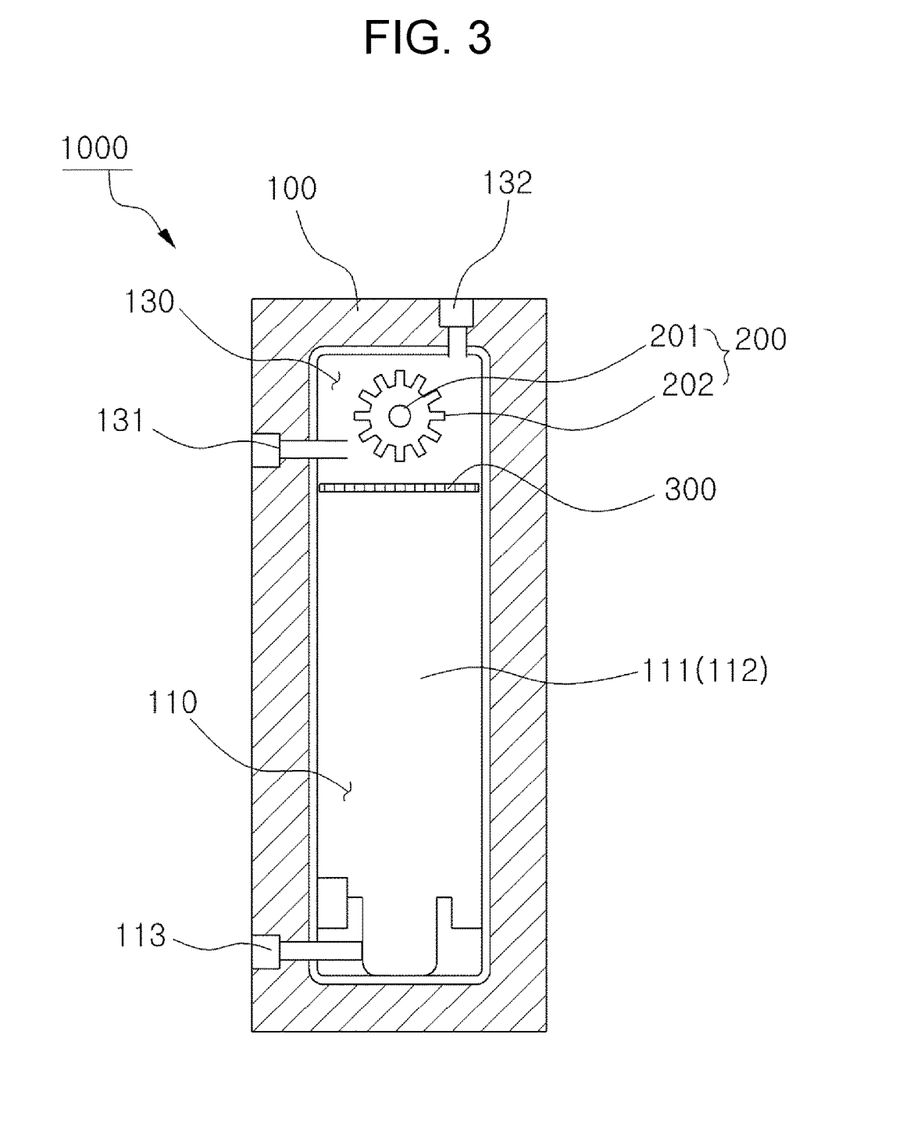
FIG. 3 is another cross-sectional view of the apparatus for preparing electrolyzed sterilizing water according to the present invention.
Figure 4:
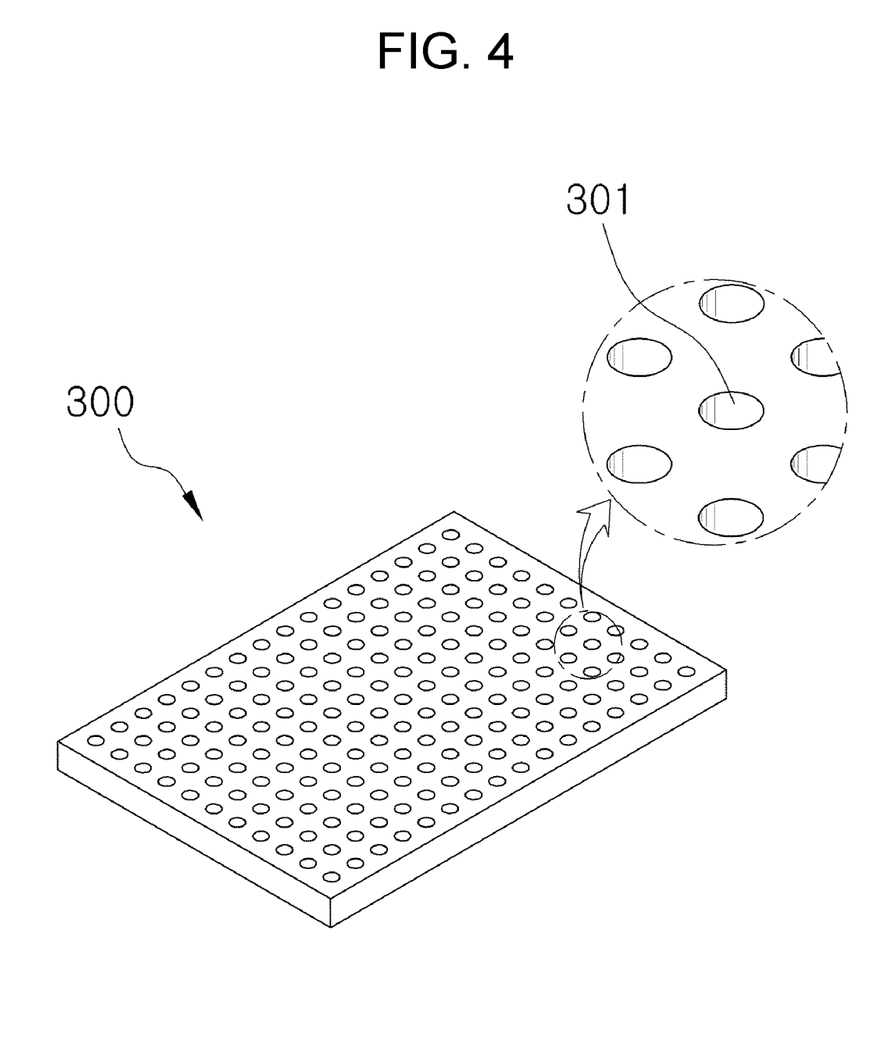
FIG. 4 is a perspective view of a distributing plate of the apparatus for preparing electrolyzed sterilizing water according to the present invention.

Here, the distributing plate 300 allows hypochlorous acid water or sodium hypochlorite water, chlorine gas, and hydrogen gas, to be separated from each other and supplied into the mixing part 130 due to the micropores 301 thereof, so that the mixing degree can be further increased (see, FIGS. 3 and 4).

In order to increase the mixing degree, with respect to the size of the micropores 301 of the distributing plate 300, the smaller the better. However, in the case where the micropores 301 have an extremely fine size, the gas generated in the reacting part 110 does not smoothly flow out, and thus the inner pressure of the reacting part 110 is increased, which may prevent the electrolyte from flowing into the reacting part 110.

For this reason, as for the apparatus for preparing electrolyzed sterilizing water 1000 of the present invention, the micropores 301 of the distributing plate 300 have a diameter of preferably 0.8 mm or greater, and the maximum diameter thereof is preferable so long as hypochlorous acid water or sodium hypochlorite water, chlorine gas, and hydrogen gas can be separated from each other.

In addition, as for the apparatus for preparing electrolyzed sterilizing water 1000 of the present invention, a predetermined space may be formed between the distributing plate 300 and the electrodes 111 and 112 to prevent the pressure inside the reacting part 110 from being increased, and the shape of the body 100 may be controlled to allow a forming region of the distributing plate 300 (region where the electrolysis product of the reacting part 110 moves into the mixing part 130) to be one-sided, so that the gas inside the reacting part 110 can easily move into the mixing part 130 through the distributing plate 300.

As described above, the apparatus for preparing electrolyzed sterilizing water 1000 of the present invention can easily prepare functional electrolyzed sterilizing water without wasting the electrolysis product, even while having a simple constitution.

Meanwhile, as for the apparatus for preparing electrolyzed sterilizing water 1000 of the present invention, the mixing part 130 is formed above the reacting part 110, such that the reacting part 110 and the mixing part 130 are formed from a lower side toward an upper side, so that the inflow of the raw water and the movement of the electrolysis product are formed approximately perpendicularly to each other. As a result, direct flow and vortex are formed inside the mixing part 130, resulting in turbulence, so that chlorine gas can be effectively soluble in the raw water and thus the entire mixing degree can be increased.

As for the apparatus for preparing electrolyzed sterilizing water 1000 of the present invention as shown in FIG. 3, the raw water inlet 131 is formed at one side surface of the body 100 and the outlet 132 is formed at an upper side of the body 100. However, the raw water inlet 131 and the outlet 132 may be formed anywhere, as long as the raw water inlet 131 and the outlet 132 can communicate with the mixing part 130.

Figure 5:
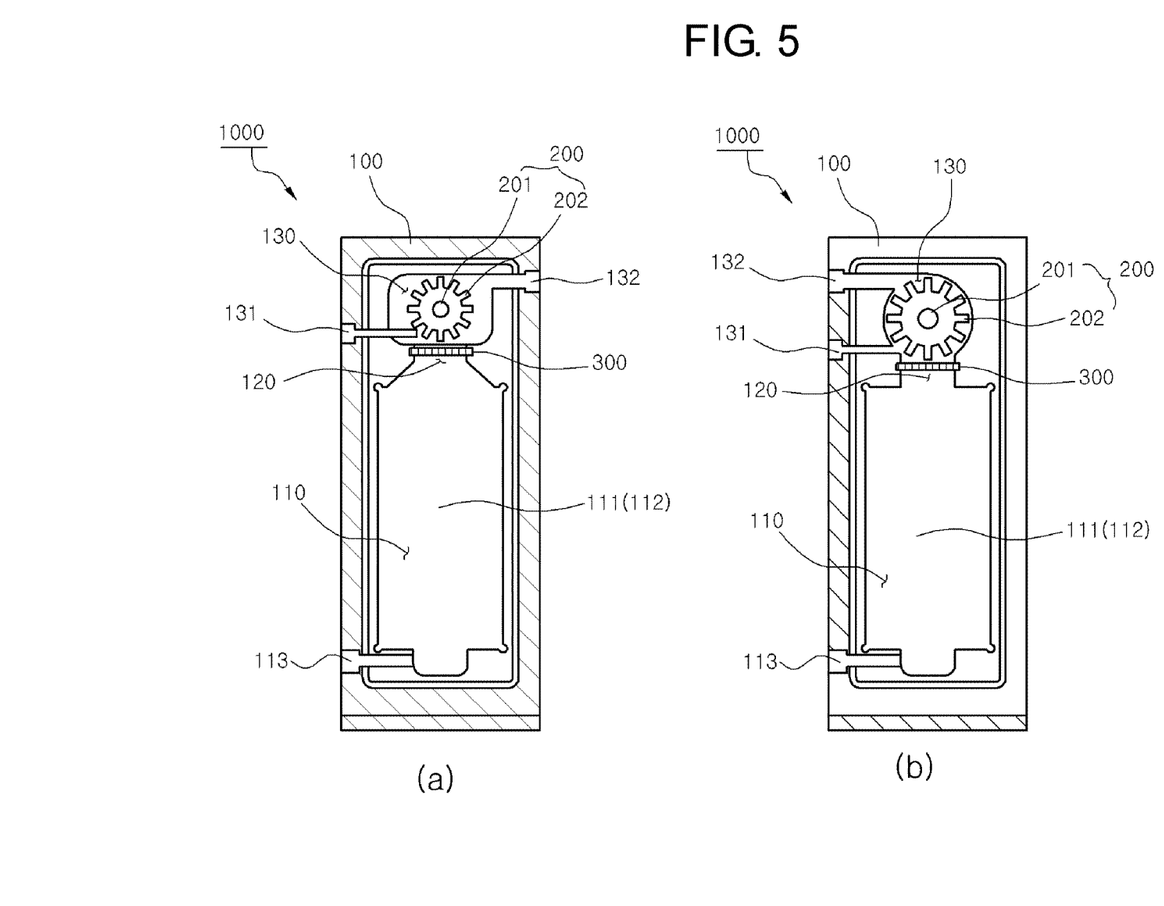
FIGS. 5A and 5B are other cross-sectional views of the apparatus for preparing electrolyzed sterilizing water according to the present invention.

FIGS. 5A and 5B show various formation positions of the raw water inlet 131 and the outlet 132. FIG. 5A shows a case where the raw water inlet 131 is formed at one side surface of the body 100 and the outlet 132 is formed at the other side surface of the body 100. FIG. 5B shows a case where the raw water inlet 131 is formed at one side surface of the body 100 and the outlet 132 is formed at an upper side of the body 100 in parallel with the raw water inlet 131.

Figure 6:
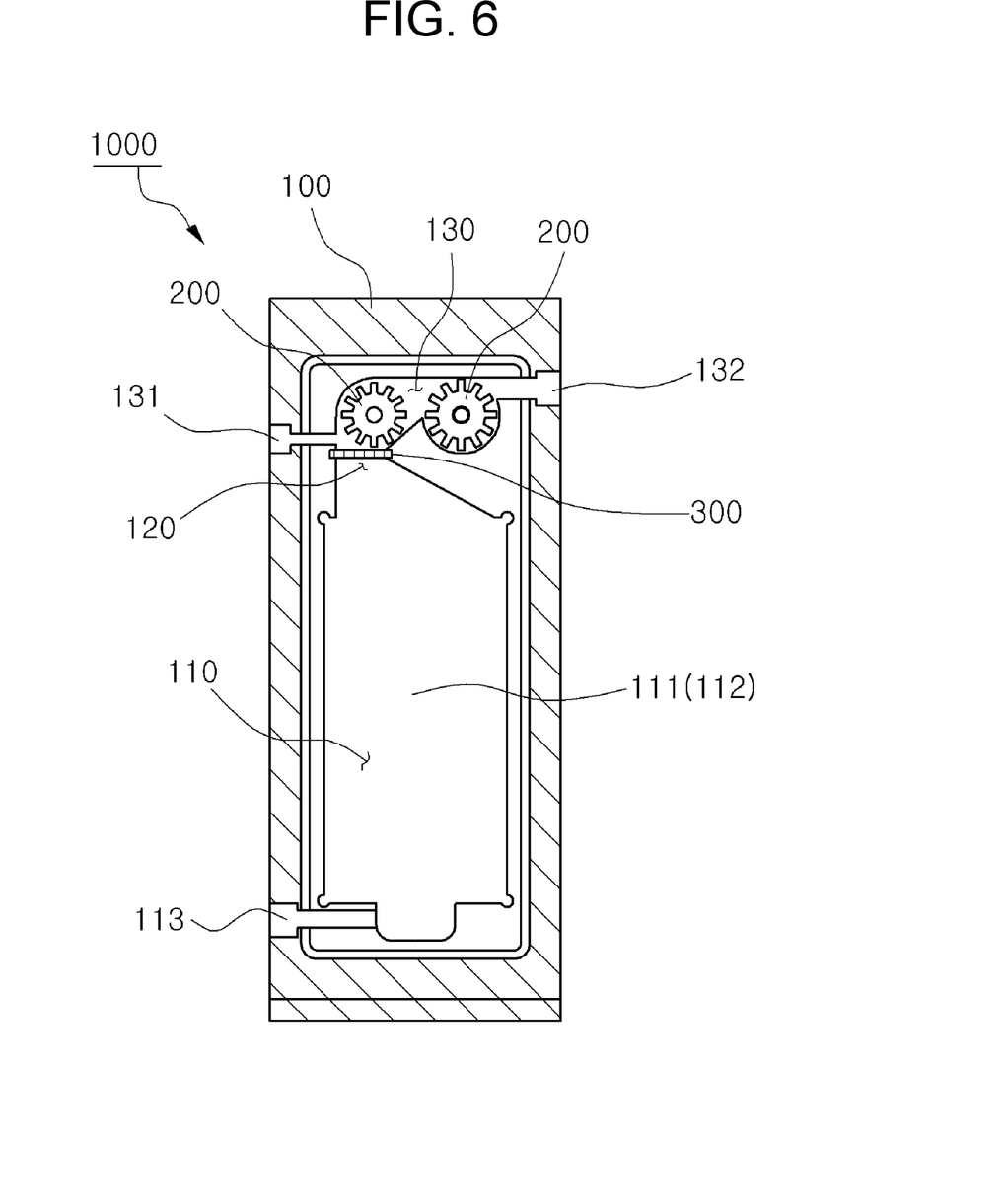
FIGS. 6 and 7 are other cross-sectional views of the apparatus for preparing electrolyzed sterilizing water according to the present invention.
Figure 7:
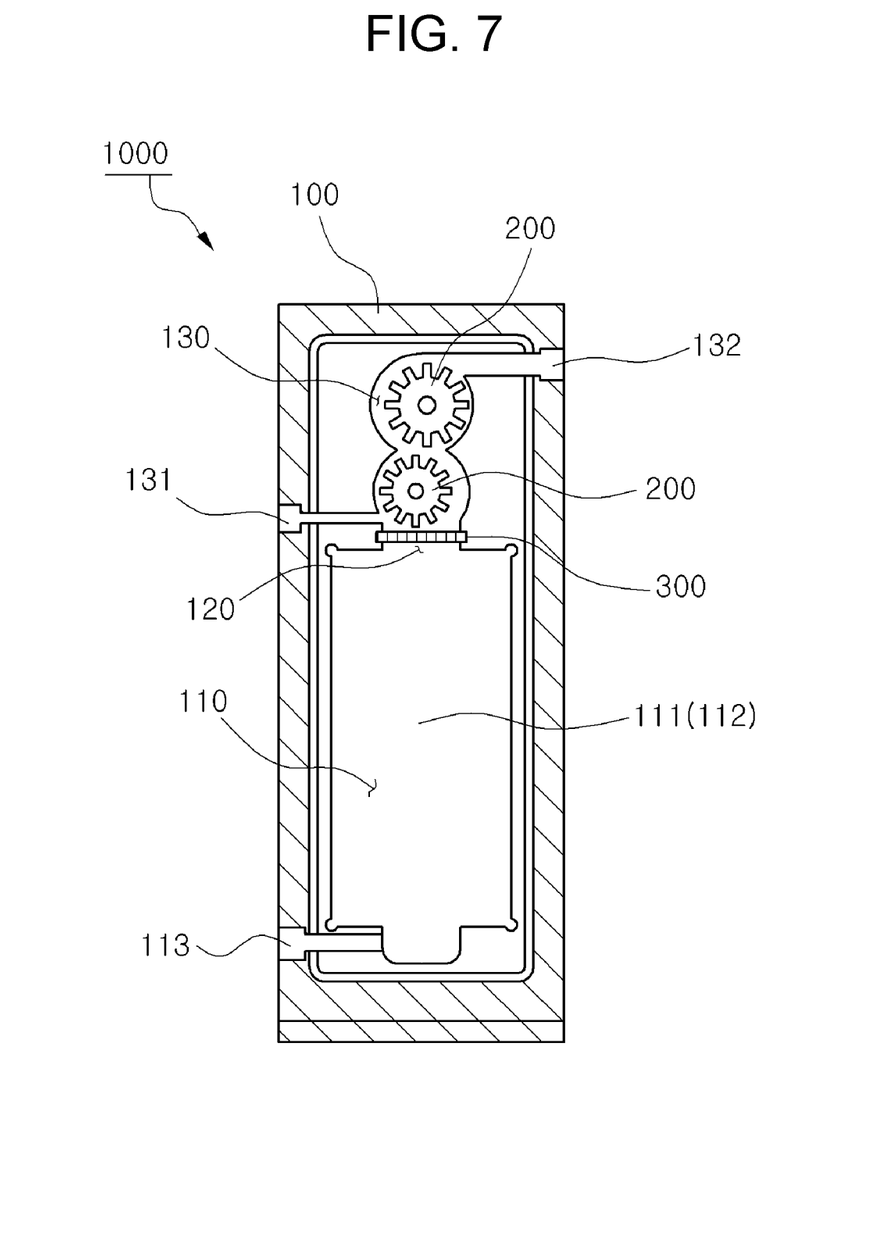

In addition, the apparatus for preparing electrolyzed sterilizing water 1000 of the present invention may include a plurality of rotating parts 200 provided inside the mixing part 130 (see, FIGS. 6 and 7).

FIG. 6 shows a case where two rotating parts 200 are provided in a width direction, and FIG. 7 shows a case where two rotating parts 200 are provided in a height direction.

Figure 8:
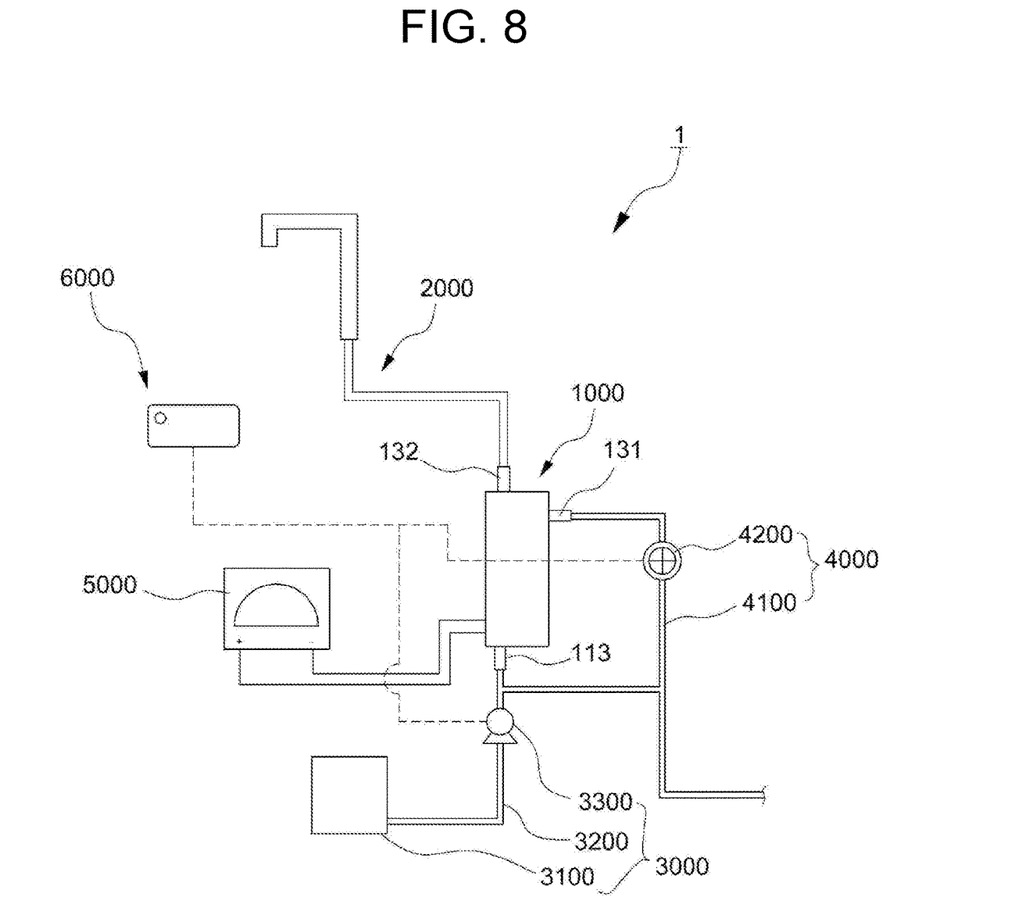
FIG. 8 is a schematic view of a system for preparing electrolyzed sterilizing water according to the present invention.

FIG. 8 is a schematic view showing a system for preparing electrolyzed sterilizing water 1 according to the present invention. The system for preparing electrolyzed sterilizing water 1 of the present invention may include an apparatus for preparing electrolyzed sterilizing water 1000, a water conduit 2000, an electrolyte feeding unit 3000, a raw water feeding unit 4000, a power supply unit 5000, and a control unit 6000.

The apparatus for preparing electrolyzed sterilizing water 1000 has the above-described characteristics.

The water conduit 2000 feeds electrolyzed sterilizing water therethrough by user manipulation, and the water conduit 2000 is connected with the outlet 132.

Here, the water conduit 2000 need not be separately installed for the purpose of operating the system for preparing electrolyzed sterilizing water 1 of the present invention, and the existing water conduit 2000 may be used as it is.

For this reason, the system for preparing electrolyzed sterilizing water 1 of the present invention can be easily set up and can have a simplified constitution.

The electrolyte feeding unit 3000 feeds the electrolyte into the reacting part 110 of the body 100. The electrolyte feeding unit 3000 may include an electrolyte storage 3100 storing an electrolyte, a first pipe 3200 connecting the electrolyte storage 3100 and the body 100, and a pump 3300 provided at the first pipe 3200.

That is, the electrolyte is stored in the electrolyte storage 3100, and moves into the first pipe 3200 by an operation of the pump 3300, and supplied into the reacting part 110.

The raw water feeding unit 4000 feeds the raw water into the mixing part 130. The raw water feeding unit 400 may include a second pipe 4100 connected with the raw water inlet 131 and a flux sensor 4200 provided at the second pipe 4100.

The operation of the raw water feeding unit 4000 is determined depending on whether a user opens or closes the water conduit 2000. As a result, the system for preparing electrolyzed sterilizing water 1 of the present invention does not need the existing separate valve for feeding the raw water therethrough, and the like.

The power supply unit 5000 is electrically conducted with the positive electrode 111 and the negative electrode 112 inside the body 100, to supply power, and thus induces an electrolysis reaction inside the reacting part 110.

The control unit 6000 controls the foregoing components. The control unit senses the feed amount of raw water by the flux sensor 4200, and thus determines the feed amount of electrolyte to control the feeding of the electrolyte by the pump 3300. Also, the control unit 6000 controls an operation of the power supply unit 5000.

Figure 9:
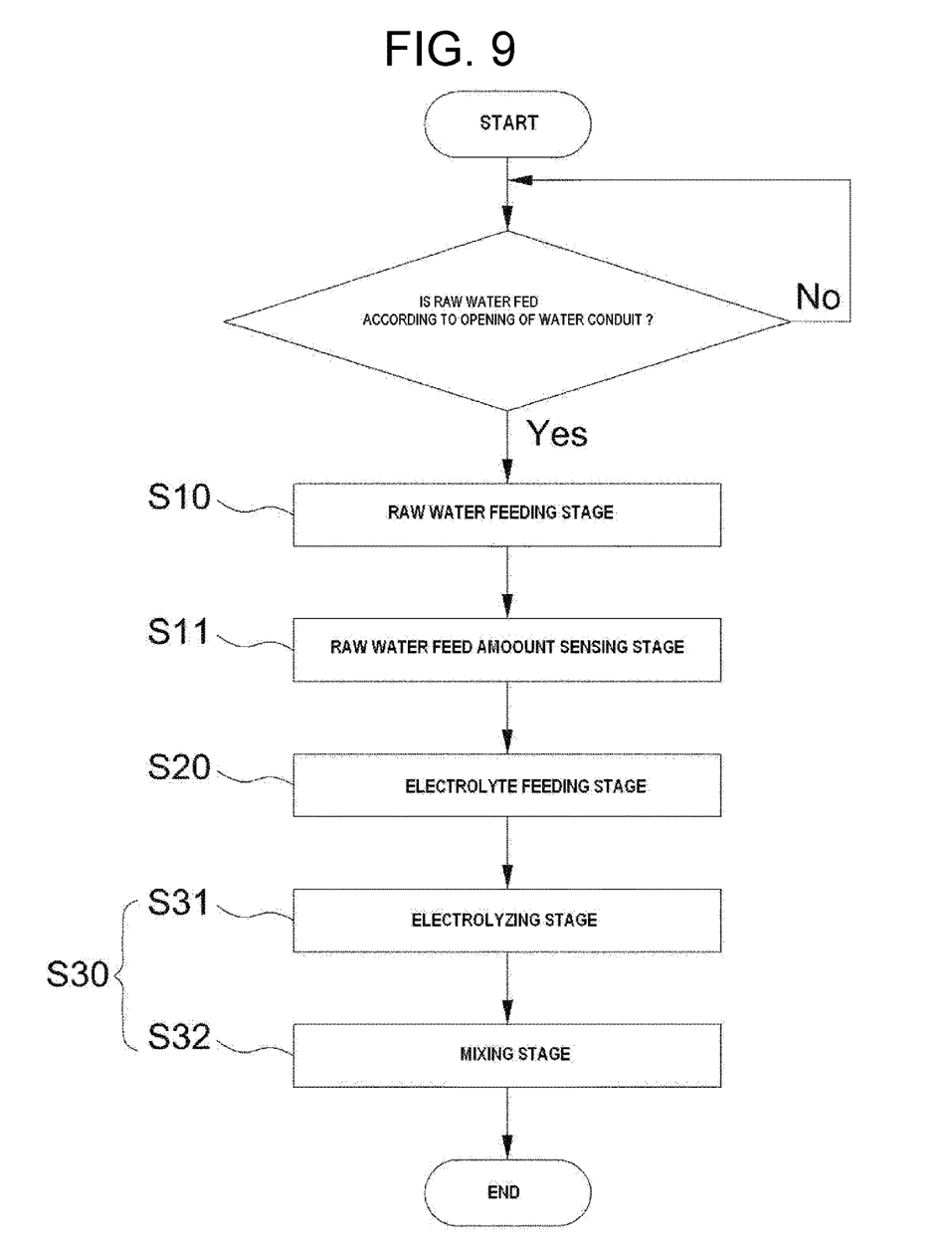
FIG. 9 is a process flow chart showing a method for preparing electrolyzed sterilizing water according to the present invention.

Meanwhile, a method for preparing electrolyzed sterilizing water by the system for preparing electrolyzed sterilizing water 1 of the present invention having the above-descried characteristics may include: a raw water feeding stage (S10); a raw water feed amount sensing stage (S11); an electrolyte feeding stage (S20); and an electrolyzed sterilizing water generating stage (S30) (see, FIG. 9).

In the raw water feeding stage (S10), the raw water is fed into the mixing part 130 from the raw water feeding unit 4000 by allowing a user to open and operate the water conduit 2000.

Here, the raw water feed amount sensing stage (S11) is carried out at the time of the raw water feeding stage (S10). In the raw water feed amount sensing stage (S11), the feed amount of raw water is sensed by the flux sensor 4200.

In the electrolyte feeding stage (S20), the electrolyte is fed through the first pump 3300 of the electrolyte feeding unit 3000 depending on the feed amount of raw water sensed in the raw water feed amount sensing stage (S11). Here, the control unit 6000 senses the amount of raw water by the flux sensor 4200, calculates the necessary amount of electrolyte, and operate the first pump 3300 to supply the calculated amount of electrolyte.

The electrolyzed sterilizing water generating stage (S30) includes an electrolyzing stage (S31) and a mixing stage (S32). In the electrolyzing stage (S31), power is applied to the electrodes 111 and 112 inside the reacting part 110 through the power supply unit 5000 to thereby electrolyze the electrolyte.

In addition, in the mixing stage (S32), the electrolysis product generated in the reacting part 110 and the raw water fed are mixed inside the mixing part 130.

The raw water feeding stage (S10) to the electrolyzed sterilizing water generating stage (S30) are almost simultaneously carried out (the electrolyte is fed immediately when the inflow of raw water is confirmed), and descriptions thereof have been described in time sequential order. However, the method for preparing electrolyzed sterilizing water of the present invention is not limited thereto.

As described above, the apparatus for preparing electrolyzed sterilizing water, and the system and the method for preparing electrolyzed sterilizing water including the same, of the present invention, can maximize electrolysis efficiency of hypochlorous acid water and sodium hypochlorite water to improve productivity, and simplify the constitution thereof and thus have a smaller size.

The present invention is not limited to the above-mentioned embodiments but may be variously applied, and may be variously modified without departing from the gist of the present invention claimed in the following claims.

The invention claimed is:

1. An apparatus for preparing electrolyzed sterilizing water, the apparatus comprising:
    a body comprising an inner side wall, an inner top surface, and an inner bottom surface;
    a reacting part provided inside the body, wherein the reacting part contains a positive electrode and a negative electrode therein, and a feeding portion is provided at one side of the reacting part to allow an electrolyte to flow into the reacting part so as to generate an electrolysis product by an electrolysis reaction inside the reacting part;
    a mixing part provided inside the body, wherein the electrolysis product and a raw water are mixed in the mixing part to generate an electrolyzed sterilizing water;
    a raw water inlet through which the raw water flows into the mixing part;
    an outlet through which the electrolyzed sterilizing water flows out from the mixing part;
    a first rotating part disposed inside the mixing part and formed of a first central shaft and a plurality of wings formed at a circumference of the first central shaft, wherein the raw water inlet protrudes from the inner side wall, extends into the mixing part, and directly faces the wings such that the kinetic energy of the raw water flowing from the raw water inlet rotates the wings and thereby uniformly mixes the raw water and the electrolysis product without an external power to rotate the wings, and wherein the rotation axis of the first rotating part is perpendicular to the direction in which the raw water inlet extends and parallel to the inner top surface; and
    a distributing plate disposed between the reacting part and the mixing part and having micropores formed therein such that the micropores micronize the electrolysis product, thereby increasing the mixing degree with the raw water, wherein the distributing plate comprises a top surface, the top surface being parallel to the rotation axis of the first rotating part.

2. The apparatus of claim 1, wherein the electrolysis product contains hypochlorous acid water (HOCl) or sodium hypochlorite water (NaOCl).

3. The apparatus of claim 1, further comprising a second rotating part having a second central shaft, wherein the rotation axis of the second rotating part is parallel to and different from the rotation axis of the first rotating part, and wherein the second rotating part is placed between the first rotating part and the outlet.

4. The apparatus of claim 3, wherein the first and the second rotating parts occupy substantial part of the mixing part.

5. The apparatus of claim 1, wherein the mixing part is formed above the reacting part.

6. A system for preparing electrolyzed sterilizing water, the system comprising:
    the apparatus for preparing electrolyzed sterilizing water of claim 5;
    a water conduit connected with the outlet;
    an electrolyte feeding unit including an electrolyte storage, a first pipe connecting the electrolyte storage and the body, and a pump provided at the first pipe, the electrolyte feeding unit feeding an electrolyte into the reacting part of the body;
    a raw water feeding unit including a second pipe connected with the raw water inlet of the mixing part and a flux sensor provided at the second pipe, the raw water feeding unit feeding the raw water into the mixing part of the body;
    a power supply unit electrically conducted with the positive electrode and the negative electrode inside the body to supply power; and
    a control unit connected with the flux sensor, the pump, and the power supply unit to control operations thereof.

7. A method for preparing electrolyzed sterilizing water using the system for preparing electrolyzed sterilizing water of claim 6, the method comprising:

a raw water feeding stage of feeding raw water into the mixing part from the raw water feeding unit by opening the water conduit;

a raw water feed amount sensing stage of sensing a feed amount of raw water by using the flux sensor in the raw water feeding stage;

an electrolyte feeding stage of feeding an electrolyte through the first pump of the electrolyte feeding unit depending on the feed amount of raw water sensed in the raw water feed amount sensing stage; and an electrolyzed sterilizing water generating stage of generating electrolyzed sterilizing water by including an electrolyzing stage of applying power to the electrodes and inside the reacting part from the power supply unit to electrolyze the electrolyte and a mixing stage of mixing an electrolysis product and the fed raw water inside the mixing part.

8. The apparatus of claim 1, wherein the outlet directly faces the wings and the rotation axis of the first rotating part is perpendicular to the direction in which the outlet extends.

9. The apparatus of claim 1, wherein the first rotating part occupies substantial part of the mixing part.

10. The apparatus of claim 1, wherein the mixing part does not directly contact the inner top surface.

* * * * *